No. 677,243. Patented June 25, 1901.
B. G. LUTHER.
DOUBLE SURFACE PLANING MACHINE.
(Application filed Sept. 17, 1898.)

(No Model.) 3 Sheets—Sheet 1.

WITNESSES: Harry J. Garceau. James W. Brennan.

INVENTOR: Benjamin G. Luther.
BY J. Scholfield.
ATTY.

No. 677,243. Patented June 25, 1901.
B. G. LUTHER.
DOUBLE SURFACE PLANING MACHINE.
(Application filed Sept. 17, 1898.)
(No Model.) 3 Sheets—Sheet 2.
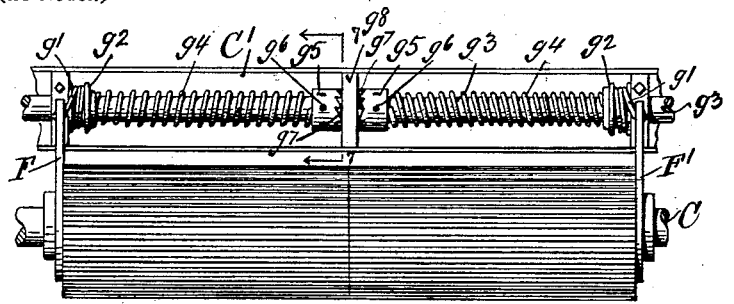
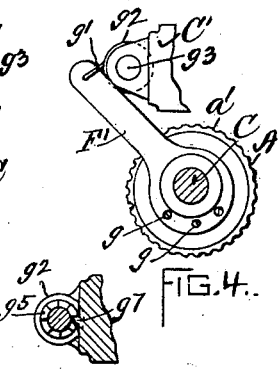
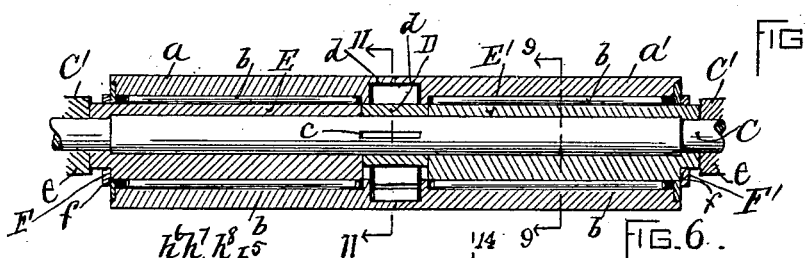
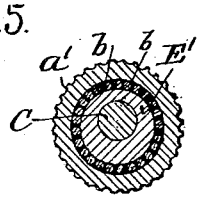
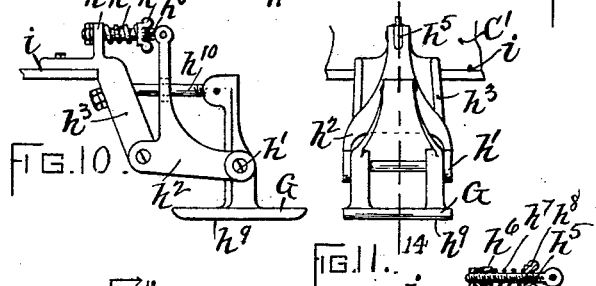
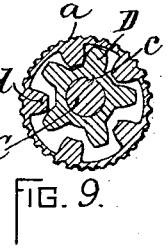
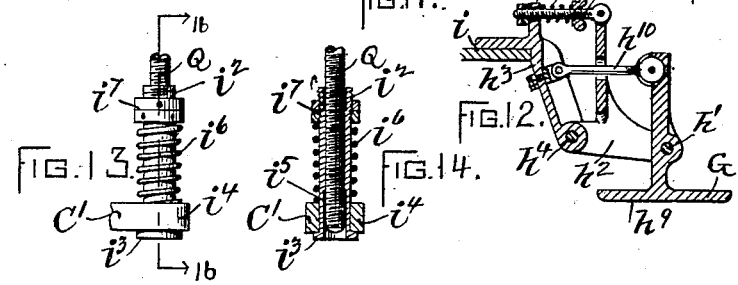
WITNESSES:
Harry J. Garceau.
James W. Brennan
INVENTOR:
Benjamin G. Luther
By J. Schofield.
ATTY.

No. 677,243. Patented June 25, 1901.
B. G. LUTHER.
DOUBLE SURFACE PLANING MACHINE.
(Application filed Sept. 17, 1898.)
(No Model.) 3 Sheets—Sheet 3.

WITNESSES: INVENTOR:
Harry J. Garceau. Benjamin G. Luther
James W. Brennan BY S. Scholfield.
ATTY.

UNITED STATES PATENT OFFICE.

BENJAMIN G. LUTHER, OF WORCESTER, MASSACHUSETTS.

DOUBLE-SURFACE-PLANING MACHINE.

SPECIFICATION forming part of Letters Patent No. 677,243, dated June 25, 1901.

Application filed September 17, 1898. Serial No. 691,235. (No model.)

*To all whom it may concern:*

Be it known that I, BENJAMIN G. LUTHER, a citizen of the United States, residing at Worcester, in the State of Massachusetts, have invented a new and useful Improvement in Double-Surface-Planing Machines, of which the following is a specification.

The nature of my invention consists in the improved construction and arrangement of the feeding-rolls, the improved construction of the presser-bar, the improved construction and arrangement of the chip-breakers, the combination of the knife-cylinder with a driven rotary bed, and in improved means for adjusting the driving-belts independently of each other, as hereinafter fully set forth.

Figure 1:
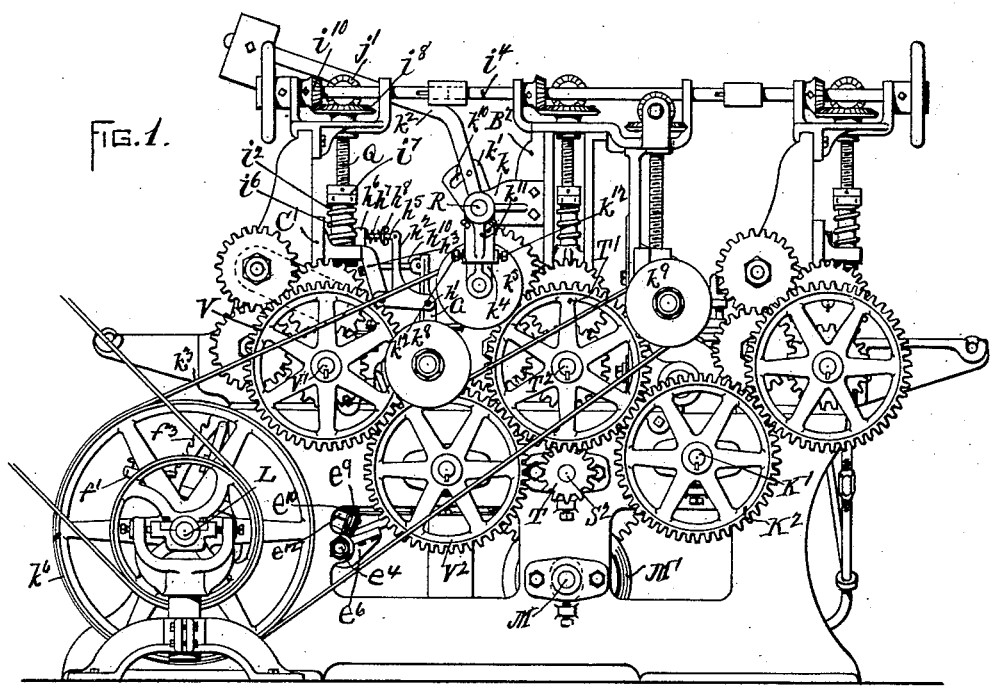
Figure 2:
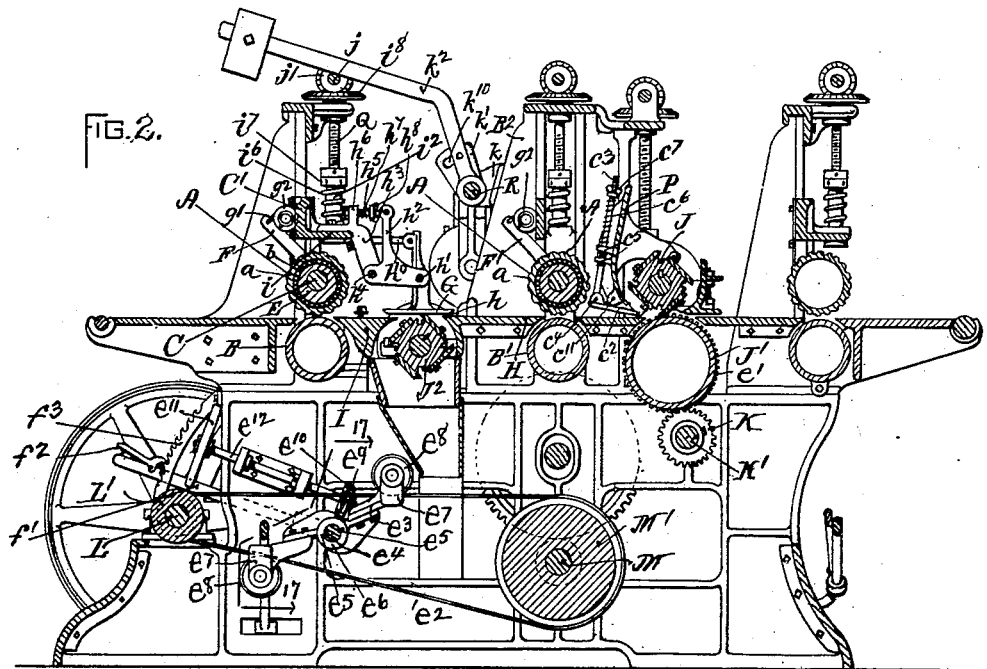
Figure 15:
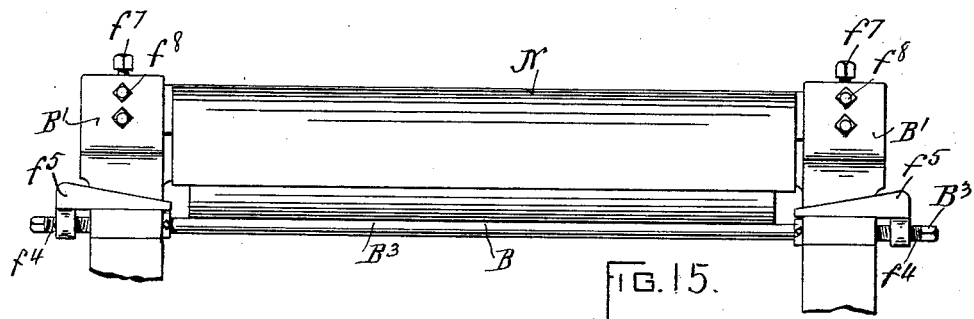
Figure 16:
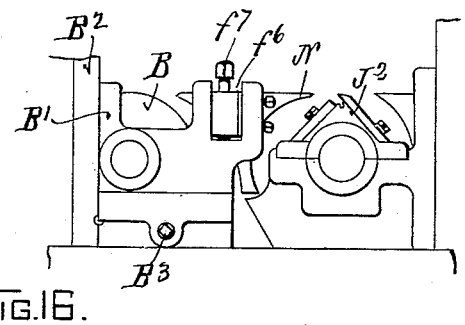
Figure 18:
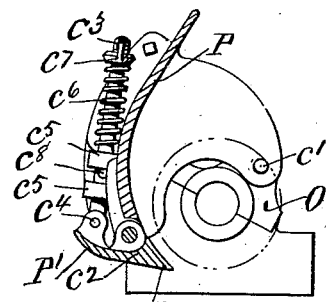
Figure 17:
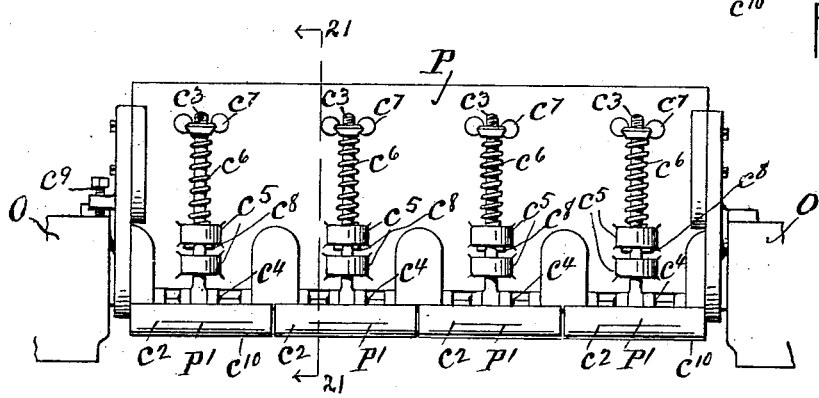

In the accompanying drawings, Figure 1 represents a side elevation of a double-surface-planing machine embodying my improvements. Fig. 2 represents a longitudinal section. Fig. 3 represents an enlarged side view of the front feed-roll made in automatically-adjustable sections. Fig. 4 represents an end view of the feed-roll shown in Fig. 3. Fig. 5 represents a detail section taken at the spring-tension clutch in the line 7 7 of Fig. 3. Fig. 6 represents a longitudinal section of the feed-roll shown in Fig. 3. Fig. 7 represents a transverse section of the feed-roll, taken in the line 9 9 of Fig. 6. Fig. 8 represents an edge view of the gear for connectedly operating the two sections of the feed-roll. Fig. 9 represents a section taken through feed-roll and gear in the line 11 11 of Fig. 6. Fig. 10 represents a side view of the parallel movement for actuating the presser-bars. Fig. 11 represents a rear elevation of one of the presser-bars looking toward the front of the machine. Fig. 12 represents a section taken in the line 14 14 of Fig. 11. Fig. 13 represents a detail side view of one of the screws for raising and lowering the ends of the yoke which forms the bearings of the upper feed-roll, showing the expansive spring which serves to hold the feed-roll upon the board with a yielding pressure. Fig. 14 represents a section taken in the line 16 16 of Fig. 13. Fig. 15 represents an elevation of the first chip-breaker, looking from the rear toward the front of the machine, showing the wedges for raising and lowering the chip-breaker. Fig. 16 represents an end view of the chip-breaker and the lower knife-cylinder. Fig. 17 represents an elevation of the several chip-breakers for the upper knife-cylinder looking from the rear toward the front of the machine. Fig. 18 represents a section taken in the line 21 21 of Fig. 17.

In the drawings, A A represent the upper feed-rolls of the machine, and B B' the opposite lower feed-rolls, the said upper feed-rolls being so constructed as to feed two boards of different thickness at the same time. The feed-rolls A A consist of the fluted sections $a\,a'$, which are hollowed out interiorly to form a cylindrical channel for the antifriction-rollers $b\,b$ and caused to rotate by means of the shaft C and the gear D, which is held to rotate with the shaft C by means of the spline $c$. The fluted roll-sections $a\,a'$ are provided with internal gears $d\,d$, which engage with the teeth of the driving-gear D. Upon the shaft C, which has its bearings in the sliding yoke C', are placed the loose eccentrics E E', which are held for automatic adjusting movement between the sides of the gear D and the ends of the bearing-boxes $e\,e$ of the shaft C. To the shoulders $f\,f$, at one side of the outer ends of the eccentrics E E', are secured the arms F F' by means of the screws $g$, as shown in Fig. 4, and to the outer ends of the arms F F' are secured the outer ends of the wire cords $g'$, which at their inner ends are secured to the pulleys $g^2$, the said pulleys being held loosely upon the continuous rod $g^3$, rigidly secured to the side of the yoke C', and are caused to turn and wind up the cords $g'$ by means of the torsion-springs $g^4$, secured at one end to the pulley and having at their opposite ends a clutch-head $g^5$, provided with the orifices $g^6$ for the proper adjustment of the tension of the spring, the said clutch-head $g^5$ engaging with fixed teeth $g^7$ at the side of the stationary plate $g^8$, and when the cords $g'$ are tightly drawn up by the action of the spring the eccentrics E E' will be carried to their extreme lower position, as shown in Figs. 6 and 7.

The short presser-bar G is made to extend from the edge $h$ of the fixed bed H to the forward edge of the chip-breaker I and is adapted for parallel up-and-down movement, the said presser-bar being pivoted at the point $h'$ to the bell-crank lever $h^2$, the said lever being pivoted to the bracket $h^3$ at the point $h^4$, and to the upper end of the bell-crank lever $h^2$ is jointed the screw-threaded bolt $h^5$, the outer end of the said bolt being loosely held in a perforation made in the upwardly-extending ear $h^6$ of the bracket $h^3$, and upon the bolt $h^5$ is placed the spiral spring $h^7$ and the thumb-nut $h^8$, by means of which the tension of the spring $h^7$ may be regulated as required. The proper parallel movement is imparted to the bearing-face $h^9$ of the presser-bar by means of the jointed link $h^{10}$, as shown in Fig. 14. Several presser-bars G, jointed to their holding-brackets $h^3$, are attached to the shelf $i$ at the rear side of the yoke C'. The presser-bars are thus adapted for boards of varying thickness. The yoke C' and the connected feed-roll A are made vertically adjustable by means of the screws Q Q, which engage with the internal screw-thread of the sleeves $i^2$, the said sleeves being provided at their lower ends with the head or collar $i^3$, which serves to secure the sleeve to the yoke C'. The sleeve $i^2$ is loosely held in a perforated ear $i^4$, which projects from the side of the yoke C', and is prevented from turning in the said ear by means of a spline $i^5$. Upon the sleeve $i^2$, above the ear $i^4$, is placed the spring $i^6$, the tension of which is regulated by means of the nuts $i^7$, and the screws Q Q are operated simultaneously to adjust the position of the feeding-roll A by means of the bevel-gears $i^8$ $i^8$, secured to the upper ends of the screws Q Q, the longitudinal hand-operated shaft $i^4$, and bevel-pinion $i^{10}$, and the transverse shaft $j$, with its attached bevel-pinions $j'$ $j'$.

Under the upper knife-cylinder J is placed the cylindrical rotary bed J', which is actuated for revolution by means of the gear-teeth $e'$ at one end of the bed and the pinion K, secured to the shaft K', which is driven by the gear $K^2$, which engages with the gear T', the number of teeth in the pinion K being so arranged as to cause the movement of the surface of the rotary bed J' somewhat faster than the movement of the board which is being planed by the revolving knives of the cylinder J, and by this means the board will be properly supported under the action of the knives, and the pitch occurring in the boards being operated upon will be prevented from accumulating upon the surface of the bed. The rotary bed will therefore by its frictional contact with the under surface of the board be kept bright and clean at all times.

Upon the driving-shaft L of the machine is secured the cone-pulley L', and to the shaft M, from which the feed-rolls are driven, is secured the opposite cone-pulley M', which is driven from the cone-pulley L' by means of the belt $e^2$. The belt-shifter $e^3$ is arranged to slide on the rock-shaft $e^4$, provided at its opposite sides with grooves adapted to receive the feathers $e^5$, held in the hub $e^6$ of the belt-shifter. To the opposite arms of the hub $e^6$ are secured the roller-stands $e^7$, carrying the belt guiding and tightening rollers $e^8$, and traversing movement is imparted to the belt-shifter $e^3$ by means of the sprocket-wheel $e^9$, the endless chain $e^{10}$, and the hand-wheel $e^{11}$ upon the shaft $e^{12}$, as shown in Fig. 2. To the end of the rock-shaft $e^4$ is secured the arm $f'$, (shown in Fig. 2,) and the outer end of the arm $f'$ is provided with the hand-catch $f^2$, adapted to engage with the notches of the curved bar $f^3$ to retain the arm $f'$ at any desired angular position, and by this means the belt $e^2$ of the cone-pulleys may be either tightened as desired or the feeding mechanism thrown out of operation while the knife-cylinders continue their motion.

The front lower feed-roll B is journaled in boxes B', which are adapted for vertical adjustment upon the uprights $B^2$, to which they are attached, the said boxes being adjusted in height by means of the screw-threaded shaft $B^3$, having the right and left hand threads $f^4$ $f^4$ for reversely operating the wedges $f^5$ $f^5$, whereby upon turning the screw-shaft $B^3$ in the proper direction the feed-roll B may be raised or lowered, as desired. The boxes B' are each provided with the recess $f^6$, which is adapted to hold the end of the lower chip-breaker N. The said chip-breaker extends from side to side of the machine and is adapted for slight adjustment in a vertical plane relatively to the axis of the lower feed-roll B by means of the adjusting-screws $f^7$ and the clamping-screws $f^8$; but the chip-breaker when set is also adjusted simultaneously with the feed-roll B.

The upper knife-cylinder J is held in the bearing-boxes O, Fig. 17, which are made adjustable by means of screws O' at each side of the machine, the said screws being connected by suitable intermediate gearing so as to turn in unison with each other, and to the inner side of the boxes O at the point $c'$ is pivoted the hood P, adapted to direct the shavings upward from the knife-cylinder, and to the back of the hood P are pivoted a series of chip-breakers P', the said chip-breakers consisting of the shoes $c^2$, pivoted to the hood at the point $c''$ and to which are jointed the sliding bolts $c^3$ at the point $c^4$, the said bolts passing loosely through perforations made in the ears $c^5$ $c^5$ at the back of the hood, and upon the upper end of the bolts $c^3$ are placed the springs $c^6$ $c^6$ and the nuts $c^7$ for adjusting the tension of the said springs. The bolt $c^3$ of the chip-breaker is provided with the transverse pin $c^8$, which by extending outward between the ears $c^5$ $c^5$ serves to limit the upward and downward movement of the said bolt, the downward turning movement of the pivoted hood P being limited by the stop-screw $c^9$, which rests upon the top of the bearing-box O. When the board is passed under the chip-breakers P' to the knife-cylinder J, the toe $c^{10}$ of the chip-breaker will be raised against the resilient action of the spring $c^6$, and when the limit of movement as controlled by the pin $c^8$ between the ears $c^5$ has been exceeded the hood P will be caused to turn upon its pivots $c'$, and thus provide for the extra thickness of the board which is passing under the knife-cylinder J.

To the rock-shaft R, held in the brackets $k\ k$, which are bolted to the uprights $B^2$, is secured the arm $k'$, provided with the curved slot $k^{10}$, and to the said arm is bolted the adjustable weighted arm $k^2$, which serves to tighten the driving-belts $k^3$ at opposite sides of the machine. Upon the opposite ends of the rock-shaft R are loosely placed the yokes $k^4$, which carry the tightening-rollers $k^5$, and at the extreme outer ends of the rock-shaft R are secured the adjusting-arms $k^{11}$, by means of which the angular position of the roller-yokes $k^4$ may be varied, so that the belts $k^3$, although of different and varying lengths, may be tightened from the same weighted arm, the angular position of either of the roller-yokes $k^4$ being made adjustable by means of the opposite adjusting-screws $k^{12}$, which at their points bear against the web $k^7$ at the side of the roller-yoke. The driving-belt $k^3$ at opposite sides of the machine passes from the driving-pulley $k^6$, over the tightening-roller $k^5$, thence around the pulley $k^8$ of the under knife-cylinder $J^2$, thence around the pulley $k^9$ of the upper knife-cylinder J, and thence back to the driving-pulleys.

In the operation of the machine two boards may be inserted between the feed-rolls at the same time, one being inserted under each of the roll-sections $a\ a'$, and the pressure thus developed causes the independent turning of the weighted eccentrics E E', thus allowing the fluted roll-sections to assume varying heights in conformity with the requirement of the thickness of the boards being operated upon. When the forwardly-moving board comes in contact with the independent presser-bars G, each presser-bar will adjust itself to the thickness of the board passing under the same, and after the rear end of the board has passed over the cutters it will be properly held, owing to the parallel movement, which so actuates the presser-bar G that the bearing-surface $h^9$ will be maintained in a plane parallel with the surface of the bed of the machine. As the board passes forward it comes in contact with the second pair of feeding-rolls, from which it passes to contact with the under side of the pivoted shoes $c^2$ of the independent chip-breakers P', thereby causing their elevation and continued close contact with the upper surface of the board, and the board after passing under the knife-cylinder J is delivered from the machine by means of the rear pair of rolls. The board when passing under the knife-cylinder J passes over the rotary bed J', which is actuated to have either a slightly faster or slower surface speed than that of the feed-rolls, whereby the accumulation of pitch upon its surface will be prevented.

The cone-pulley feed mechanism may be stopped and started independently of the rotation of the knife-cylinders by means of the catch-arm $f'$, and by means of the said mechanism the speed of the feed-rolls may be varied as desired.

The lower feed-rolls B B' are connectedly driven from the variable-feed mechanism by means of the pinion S upon the shaft M, which engages with the gear S' upon the shaft $S^2$, at the opposite end of which is secured the pinion T, which engages with the gear T' upon the shaft $T^2$ of the lower feed-roll B', the lower feed-roll B being driven from the gear T' by means of the gear V upon the shaft V' of the lower feed-roll B and the intermediate gear $V^2$, the upper feed-rolls A A being driven from the shafts of their lower feed-rolls by means of a combination of four gears, as usual in planing-machines.

The inventions which are shown and described in this application and are not claimed therein are shown, described, and claimed in my applications for Letters Patent, filed October 30, 1899, Serial Nos. 735,292 and 735,293.

I claim as my invention—

1. In a wood-planing machine, a feed-roll formed in fluted sections, which are connectedly driven from the roll-shaft, by means of an internal gear, and having adjustable eccentrics within the said sections, which provides for the operation of the fluted sections of the roll, at varying heights, substantially as described.

2. In a wood-planing machine, the combination of the upper feed-roll, and the yoke, with the bell-crank levers connected with the yoke, the bolts jointed to the upper ends of the bell-crank levers, means for loosely holding the outer ends of the bolts, the tension-springs, the presser-bars pivoted to the bell-crank levers, and the connecting-links, whereby a parallel movement will be imparted to the presser-bars, substantially as described.

3. In a wood-planing machine, the combination of the lower feed-roll, the bearing-boxes for the same, and the reversely-operated wedges for raising and lowering the said boxes, with the lower chip-breaker held by the boxes, and the screws for adjusting and clamping the chip-breaker in a vertical plane relatively to the axis of the lower feed-roll, substantially as described.

4. In a wood-planing machine, the combination of the upper knife-cylinder, the bearing-boxes, the hood pivoted to the boxes, the series of chip-breakers pivoted to the back of the hood, the sliding bolts jointed to the chip-breakers, and provided with limiting-stops and the tension-springs, and the stop for limiting the downward movement of the hood, substantially as described.

5. In a wood-planing machine, the combination of the feed-rolls, and the upper knife-cylinder, with the rotary bed located under the knife-cylinder and having a surface speed varying from that of the feed-rolls, whereby the accumulation of pitch upon the surface of the rotary bed will be prevented, substantially as described.

BENJAMIN G. LUTHER.

Witnesses:
SOCRATES SCHOLFIELD,
JOSEPH K. GREENE.